United States Patent
Syed et al.

(10) Patent No.: US 10,665,913 B2
(45) Date of Patent: May 26, 2020

(54) THERMAL PROPAGATION MITIGATION FOR HV BATTERY MODULES

(71) Applicant: GM Global Technology Operations LLC, Detroit, MI (US)

(72) Inventors: Sami A. Syed, Windsor (CA); Herman K. Phlegm, West Bloomfield, MI (US); Mahmoud H. Abd Elhamid, Troy, MI (US); Edgar P. Calderon, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1312 days.

(21) Appl. No.: 14/710,192

(22) Filed: May 12, 2015

(65) Prior Publication Data

US 2016/0336627 A1 Nov. 17, 2016

(51) Int. Cl.
| | |
|---|---|
| *H01M 10/6551* | (2014.01) |
| *H01M 10/613* | (2014.01) |
| *H01M 10/653* | (2014.01) |
| *C09D 5/18* | (2006.01) |
| *H01M 2/10* | (2006.01) |
| *H01M 2/02* | (2006.01) |

(52) U.S. Cl.
CPC ........ *H01M 10/6551* (2015.04); *C09D 5/185* (2013.01); *H01M 2/0257* (2013.01); *H01M 2/1022* (2013.01); *H01M 10/613* (2015.04); *H01M 10/653* (2015.04)

(58) Field of Classification Search
CPC .... H01M 10/613; H01M 10/653; C09D 5/185
See application file for complete search history.

(56) References Cited

U.S. PATENT DOCUMENTS

| | | | | | |
|---|---|---|---|---|---|
| 3,955,987 | A | * | 5/1976 | Schaar | C09D 5/185 106/18.15 |
| 2004/0220313 | A1 | * | 11/2004 | Rogers | C08J 3/203 524/417 |

(Continued)

FOREIGN PATENT DOCUMENTS

| | | | | | |
|---|---|---|---|---|---|
| JP | 2009140714 A | * | 6/2009 | | |
| WO | WO-2014111364 A1 | * | 7/2014 | | C09K 21/00 |

OTHER PUBLICATIONS

Dong, Ying, and Guojian Wang. "Influence of Nano-Boron Nitride on Fire Protection of Waterborne Fire-Resistive Coatings." Journal of Coatings Technology and Research, vol. 11, No. 2, 2013, pp. 265-272., doi:10.1007/s11998-013-9542-y. (Year: 2013).*

(Continued)

*Primary Examiner* — Ula C Ruddock
*Assistant Examiner* — Anna Korovina
(74) *Attorney, Agent, or Firm* — Reising Ethington P.C.

(57) ABSTRACT

A high voltage battery module includes a plurality of battery cells, a plurality of cooling fins dispersed between the battery cells, and a frame for holding the plurality of battery cells and the plurality of fins. An intumescent layer is proximate to at least one battery module component selected from the battery cells, the plurality of cooling fins, and the frame. The intumescent layer includes sodium silicate having formula $Na_2SiO_3$, pentaerythitol, a resin that is cross-linked by melamine, boron nitride particles, and triammonium phosphate.

18 Claims, 4 Drawing Sheets

(56) References Cited

U.S. PATENT DOCUMENTS

| | | | | |
|---|---|---|---|---|
| 2005/0253553 A1* | 11/2005 | Phillips | ............... | H01M 2/1022 320/112 |
| 2006/0079612 A1* | 4/2006 | Troutman | .............. | C09D 5/185 524/99 |
| 2009/0315389 A1* | 12/2009 | Seradarian | ................ | B60B 7/01 301/8 |
| 2010/0136404 A1* | 6/2010 | Hermann | ............ | H01M 2/1016 429/120 |
| 2010/0223878 A1* | 9/2010 | Lipka | ..................... | C09D 5/185 52/741.3 |
| 2010/0301286 A1* | 12/2010 | Dittmar | .................. | C09K 21/12 252/602 |
| 2015/0325826 A1* | 11/2015 | Verhaag | ................ | C09K 21/00 429/99 |

OTHER PUBLICATIONS

Wilkipedia, Condensation Polymer (Year: 2019).*
Jacobus Bisschoff, Oxygenated Hydrocarbon Compounds as Flame Retardants for Polyester Fabric, Chapter 6, 2000 (Year: 2000).*

* cited by examiner

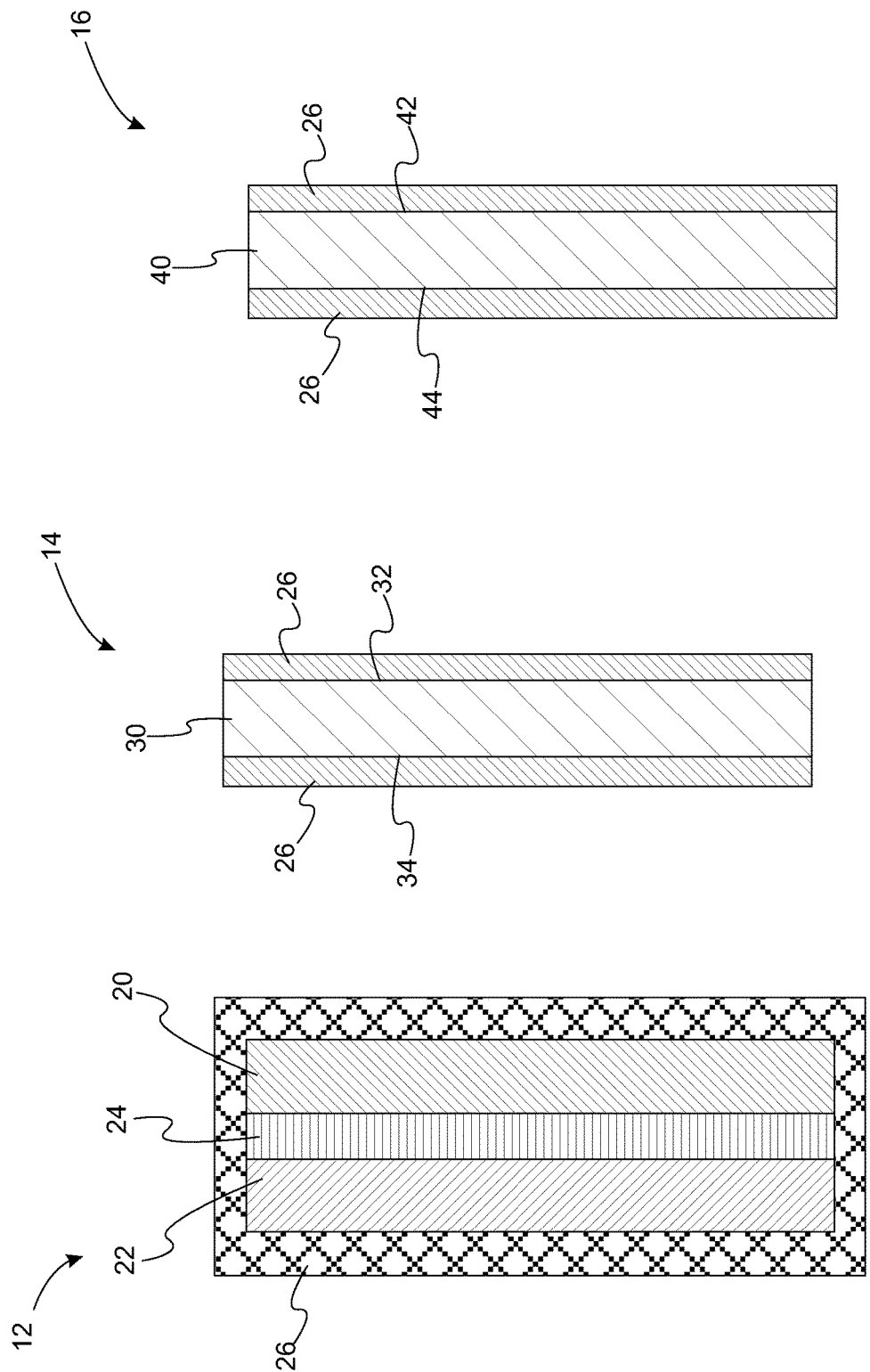

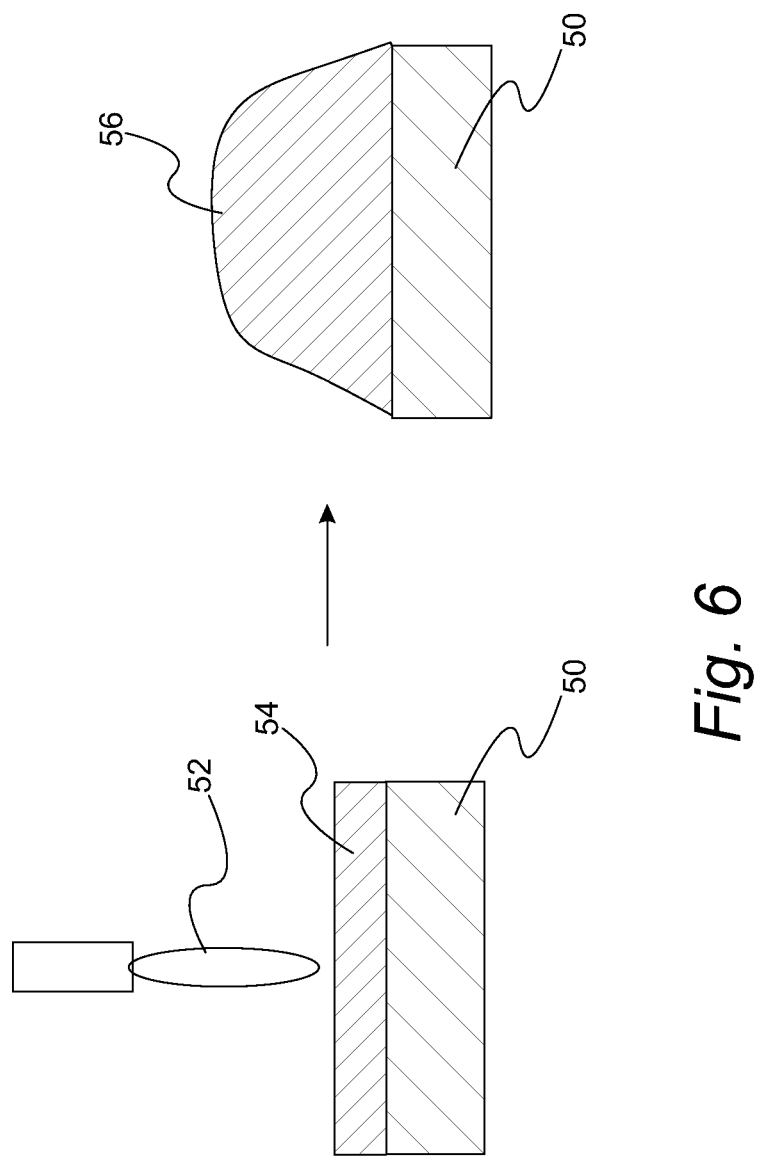

THERMAL PROPAGATION MITIGATION FOR HV BATTERY MODULES

TECHNICAL FIELD

In at least one aspect, the present invention relates to intumescent coatings for electronic components, and in particular, to intumescent coatings for circuit boards and fuses that may be subject to overheating and a fire hazard.

BACKGROUND

Many electronic devices are subject to overheating thereby providing some risk of fire. For example, a large amount of heat can be generated by a short circuit in a device. Such a short circuit may occur by inadvertent contact of an electronic component with water from a coolant leak or moisture accumulation. Moreover, a failing component might cause a high electric potential which also creates a risk of fire or thermal runaway.

Prior art methods attempt to address the risks of fire hazards in electronic devices in a variety of ways. For example, an electronic device might be encased in a fire resistant enclosure. Although such methods work reasonably well, few prior art methods which address fire resistance provide multidimensional solutions to this problem.

Accordingly, there is a need for methods and components for reducing the risk of fire in an electronic component while providing fire suppression if a fire should occur.

SUMMARY

The present invention solves one or more problems of the prior art by providing in at least one embodiment, a high voltage battery module having a component that is coated with an intumescent layer. The high voltage battery module includes a plurality of battery cells, a plurality of cooling fins dispersed between the battery cells, and a frame for holding the plurality of battery cells and the plurality of fins. An intumescent layer is proximate to at least one battery module component selected from the battery cells, the plurality of cooling fins, and the frame. The intumescent layer includes sodium silicate having formula $Na_2SiO_3$, pentaerythritol, a resin that is cross-linked by melamine, boron nitride particles, and triammonium phosphate.

In another embodiment, a high voltage battery module having a component that is coated with an intumescent layer is provided. The high voltage battery module includes a plurality of battery cells, a plurality of cooling fins dispersed between the battery cells, and a frame for holding the plurality of battery cells and the plurality of fins. An intumescent layer coats one or more of the cooling fins. The intumescent layer includes sodium silicate having formula $Na_2SiO_3$, pentaerythritol, a resin that is cross-linked by melamine, boron nitride particles, and triammonium phosphate.

In another embodiment, a coated circuit board with fire resistance is provided. The coated circuit board includes a circuit board substrate and an intumescent layer disposed over the circuit board substrate. The intumescent layer includes sodium silicate in an amount from about 25 to 50 weight percent of the total weight of the intumescent layer, pentaerythritol in an amount from about 2 to 20 weight percent of the total weight of the intumescent layer, a condensation polymer that is cross-linked by melamine in an amount from about 20 to 60 weight percent of the total weight of the intumescent layer, boron nitride particles in an amount from about 2 to 30 percent of the total weight of the intumescent layer, and triammonium phosphate in an amount from about 0.1 to 3 percent of the total weight of the intumescent layer.

BRIEF DESCRIPTION OF THE DRAWINGS

FIG. 2 is a schematic cross section of a battery cell coated with an intumescent layer;

FIG. 3 is a schematic cross section of a battery cooling fin coated with an intumescent layer;

FIG. 4 is a schematic cross section of a battery module foamed layer coated with an intumescent layer;

FIG. 6 is a schematic depiction of the expansion of an embodiment of an intumescent layer upon exposure of an electronic component substrate to a flame.

DETAILED DESCRIPTION

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the"

comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
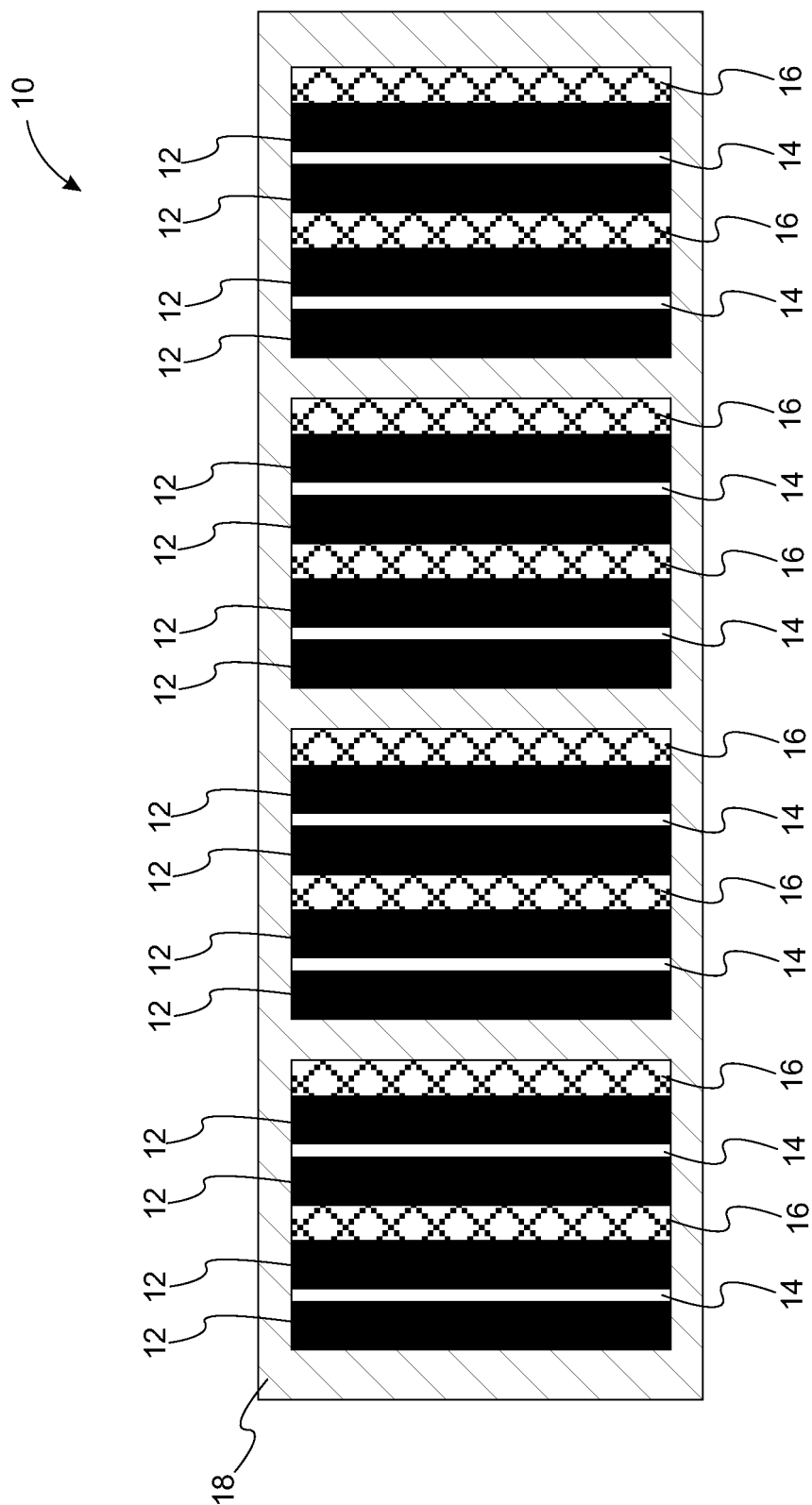
FIG. 1 is a schematic cross section of a battery module having one or more intumescent layers.

With reference to FIG. 1, a schematic cross section of a battery module having one or more intumescent layers is provided. Battery module 10 includes a plurality of battery cells 12. Cooling fins 14 are interposed between battery cells 12. In a refinement, foamed layers 16 are also interposed between battery cells 12 and cooling fins 14. Battery cells 12, cooling fins 14, and foamed layers 16 are positioned in and held in place by battery module frame 18. Battery module 10 also includes an intumescent layer proximate to and typically contacting a battery module component (e.g., battery cell, cooling fin, foam layer, frame, etc.). In a refinement, the intumescent layer encapsulates a battery module component. In other refinements, the intumescent layer is in the form of a gel or foam. Characteristically, the intumescent layer 16 includes sodium silicate having formula $Na_2SiO_3$, pentaerythritol, a resin that is cross-linked by melamine (e.g., melamine residues), boron nitride particles, and triammonium phosphate.

With reference to FIG. 2, a schematic cross section of a battery cell coated with an intumescent layer is provided. Battery cell 12 includes anode 20 and cathode 22 with separator 24 interposed between the anode and cathode. Intumescent layer 26 is disposed over and typically contacts battery cell 12. In this refinement, intumescent layer 26 is a coating. Although FIG. 2 depicts intumescent layer 26 encapsulating battery cell 12, the intumescent layer may only be applied to one or more surfaces of the cooling fin.

With reference to FIG. 3, a schematic cross section of a battery cooling fin coated with an intumescent layer is provided. Cooling fin 14 includes cooling fin substrate 30 (i.e., an uncoated cooling fin). Intumescent layer 26 is disposed over and typically contacts cooling fin substrate 30. In this refinement, intumescent layer 26 is a coating on opposing sides 32 and 34 of the cooling fin substrate. In another refinement, intumescent layer 26 encapsulates cooling fin substrate 30.

With reference to FIG. 4, a schematic cross section of a battery module foamed layer coated with an intumescent layer is provided. Foamed layer 16 includes foamed layer substrate 40 (i.e., an uncoated foamed layer). Intumescent layer 26 is disposed over and typically contacts foamed layer substrate 40. In this refinement, intumescent layer 26 is a coating on opposing sides 42 and 44 of the foamed layer substrate. In another refinement, intumescent layer 26 encapsulates foamed layer substrate 40.

Figure 5:
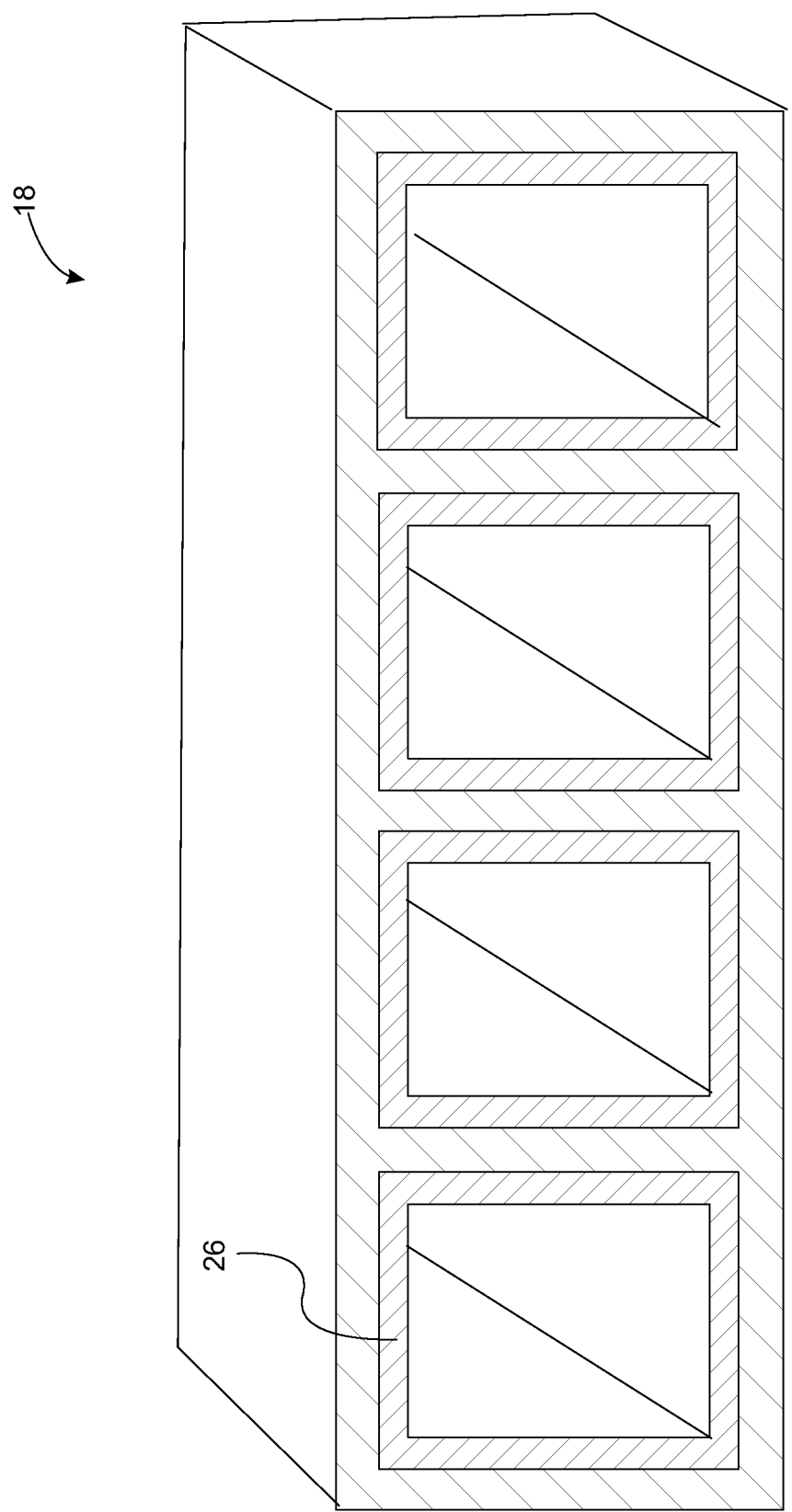
FIG. 5 is a perspective view of a battery module frame coated with an intumescent layer.

With reference to FIG. 5, a perspective view of a battery module frame coated with an intumescent layer is provided. Battery module frame 18 includes a substrate battery frame coated by intumescent layer 26.

Advantageously, intumescent layer 26 provides three basic functions. The first function compliments the conformable coating aspect of intumescent layer 26. For example, upon the generation of heat due to a short circuit (e.g., caused by a coolant leak or moisture accumulation) or the presence of a high electric potential (tested to 394V), the $Na_2SiO_3$ decomposes and swells to prevent further ingress of $O_2$ to the substrate (i.e., the swelling of intumescent layer acts as a chemical sealant). FIG. 6 schematically depicts this expansion upon exposure of battery module component substrate 50 to a flame 52. Intumescent layer 54 is observed to expand and form an insulating char layer 56 of $Na_2SiO_3$ that can be up to 50 times the thickness of the battery module component substrate 50. Advantageously, this keeps the electronic component below its critical temperature maintaining the structural integrity of the underlying material.

The secondary function of the intumescent layer is flame retardancy. In this regard, the ammonium phosphate decomposes upon heating to give phosphoric acid:

The generated phosphoric acid catalyzes the degradation of the pentaerythritol to form carbonaceous foam and water as generally depicted by the following reaction:

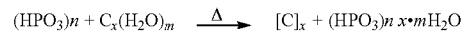

Melamine decomposes to form water and $N_2$ in the presence of heat and is, therefore, useful in suppressing fire formation:

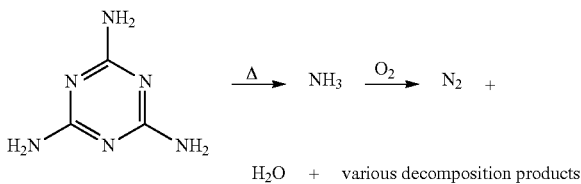

The various decomposition products include the following molecular moieties: $-CH_2-O-CH_2-$, $-NH_2$, $NH-CH_2-$, $NR_3$, and $-CH_2-OH$ where $R_3$ is methyl or ethyl.

The final function is to assist in heat dissipation from the electronic device. This is accomplished by the boron nitride and, in particular, nBN (nanostructured boron nitride) in the intumescent layer. For example, hexagonal boron nitride is reported to have thermal transfer values up to 1700 W/m-K. Moreover, hexagonal boron nitride is thermally but not electrically conductive. In addition to protection against oxidation (i.e. thermal runaway), embodiments of the intumescent layer can rapidly displace any heat accumulated on an electronic device (e.g., a fuse) to the surrounding environment.

In a variation of the present embodiment, the sodium silicate is present in an amount of sodium silicate of 25 to 50 weight percent of the total weight of the intumescent layer. In a variation, the sodium silicate is present in an amount of sodium silicate of 30 to 35 weight percent of the intumescent layer.

In still another variation, the pentaerythritol is present in an amount from about 2 to 20 weight percent of the total weight of the intumescent layer. In a refinement, the pentaerythritol is present in an amount from about 5 to 10 weight percent.

In still another variation, the resin cross-linked by melamine is present in an amount from about 20 to 60 weight percent of the total weight of the intumescent layer. In a refinement, the resin cross-linked by melamine is present in an amount from about 30 to 40 weight percent, the boron nitride is present in an amount of about 5 to 20 weight percent, Typically, the boron nitride of intumescent layer 16 is a nanostructured boron nitride having an average spatial dimension from about 20 to 100 nanometers. In another variation, the boron nitride is present in an amount from about 2 to 30 percent. In a refinement, the boron nitride is present in an amount of about 5 to 20 weight percent.

In yet another variation, the triammonium phosphate is present in an amount from about 0.1 to 3 percent of the total weight of the intumescent layer. triammonium phosphate is present in an amount from about 0.5 to 1 weight percent.

In another embodiment, an intumescent layer-forming composition for applying the intumescent layer set forth above is provided. The composition includes a solvent, pentaerythritol, a resin that is cross-linked by melamine, boron nitride particles, and triammonium phosphate. Examples of suitable solvents include water, alcohols (e.g., ethanol, methanol, propanol, etc.) In one variation, the composition is an emulsion. In a refinement, the composition includes sodium silicate in an amount from about 2.5 to 25 weight percent of the total weight of the composition, the pentaerythritol in an amount from about 0.2 to 10 weight percent of the total weight of the composition, the resin cross-linked by melamine in an amount from about 2.0 to 30 weight percent of the total weight of the composition, the boron nitride in an amount from about 0.2 to 15 percent of the composition, triammonium phosphate in an amount from about 0.01 to 1.5 percent of the total weight of the intumescent layer, and the balance is solvent (e.g., typically from 10 to 50 weight percent). In general, the intumescent layer-forming composition is applied to an electronic component substrate and then the solvent is allowed to evaporate (e.g., drying or curing).

Tables 1 and 2 provide representative compositions of the intumescent coating that are suitable for protecting electronic devices.

TABLE 1

Intumescent coating composition

| Ingredient | Weight Percent |
|---|---|
| $Na_2SiO_3$ | 30 to 35 |
| pentaerythritol | 5 to 10 |
| melamine | 30 to 40 |
| nBN | 5 to 10 |
| $(NH_4)_3PO_4$ | 0.5 to 1 |
| filler | about 4 |

TABLE 2

Intumescent coating composition

| Ingredient | Weight Percent |
|---|---|
| $Na_2SiO_3$ | 30 to 35 |
| pentaerythritol | 5 to 10 |
| melamine/alkyd | 30 to 40 |
| nBN | 5 to 20 |
| $(NH_4)_3PO_4$ | 0.5 to 1 |
| filler | about 4 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A high voltage battery module comprising:
a plurality of battery cells;
a plurality of cooling fins dispersed between the plurality of battery cells;
a frame for holding the plurality of battery cells and the plurality of cooling fins; and
an intumescent layer proximate to at least one battery module component, the intumescent layer including:
sodium silicate having a formula $Na_2SiO_3$;
pentaerythritol;
a resin that is cross-linked by melamine, wherein the resin includes a polyester resin or an epoxy resin;
boron nitride particles; and
triammonium phosphate;
wherein the sodium silicate is present in an amount from about 25 weight percent to 50 weight percent of the total weight of the intumescent layer, the pentaerythritol is present in an amount from about 2 weight percent to 20 weight percent of the total weight of the intumescent layer, the resin cross-linked by melamine is present in an amount from about 20 weight percent to 60 weight percent of the total weight of the intumescent layer, the boron nitride particles are present in an amount from about 2 weight percent to 30 weight percent of the total weight of the intumescent layer, and the triammonium phosphate is present in an amount from about 0.1 weight percent to 3 weight percent of the total weight of the intumescent layer.

2. The high voltage battery module of claim 1 wherein the boron nitride particles are nanostructured boron nitride particles having an average spatial dimension from about 20 to 100 nanometers.

3. The high voltage battery module of claim 1 wherein the sodium silicate is present in an amount from about 30 weight percent to 35 weight percent of the total weight of the intumescent layer, the pentaerythritol is present in an amount from about 5 weight percent to 10 weight percent of the total weight of the intumescent layer, the resin cross-linked by melamine is present in an amount from about 30 weight percent to 40 weight percent of the total weight of the intumescent layer, the boron nitride is present in an amount from about 5 weight percent to 20 weight percent of the total weight of the intumescent layer, and the triammonium phosphate is present in an amount from about 0.5 weight percent to 1 weight percent of the total weight of the intumescent layer.

4. The high voltage battery module of claim 1 wherein the intumescent layer further includes a filler.

5. The high voltage battery module of claim 1 wherein the intumescent layer is a gel or foam.

6. The high voltage battery module of claim 1 wherein at least one cooling fin is coated with or encapsulated by the intumescent layer.

7. The high voltage battery module of claim 1 wherein at least one battery cell is coated with or encapsulated by the intumescent layer.

8. The high voltage battery module of claim 1 further comprising foamed layers that are interposed between battery cells and cooling fins, the foamed layers being coated with the intumescent layer or encapsulated by the intumescent layer.

9. The high voltage battery module of claim 1 wherein the intumescent layer is a foamed layer that is interposed between battery cells and cooling fins.

10. The high voltage battery module of claim 1 wherein the frame is coated with or encapsulated by the intumescent layer.

11. A high voltage battery module comprising:
a plurality of battery modules;
a plurality of cooling fin assemblies dispersed between the plurality of battery modules, the plurality of cooling fin assemblies at least partially coated by an intumescent layer, the intumescent layer including:
   sodium silicate in an amount from about 25 weight percent to 50 weight percent of the total weight of the intumescent layer;
   pentaerythritol in an amount from about 2 weight percent to 20 weight percent of the total weight of the intumescent layer;
   a resin that is cross-linked by melamine in an amount from about 20 weight percent to 60 weight percent of the total weight of the intumescent layer, the resin including a polyester resin or an epoxy resin;
   boron nitride particles in an amount from about 2 weight percent to 30 weight percent of the total weight of the intumescent layer; and
   triammonium phosphate in an amount from about 0.1 weight percent to 3 weight percent of the total weight of the intumescent layer.

12. The high voltage battery module of claim 11 wherein the boron nitride particles are nanostructured boron nitride particles having an average spatial dimension from about 20 nanometers to 100 nanometers.

13. The high voltage battery module of claim 11 wherein the sodium silicate is present in an amount from about 30 weight percent to 35 weight percent of the total weight of the intumescent layer, the pentaerythritol is present in an amount from about 5 weight percent to 10 weight percent of the total weight of the intumescent layer, the resin that is cross-linked by melamine is present in an amount from about 30 weight percent to 40 weight percent of the total weight of the intumescent layer, the boron nitride is present in an amount from about 5 weight percent to 20 weight percent of the total weight of the intumescent layer, and the triammonium phosphate is present in an amount from about 0.5 weight percent to 1 weight percent of the total weight of the intumescent layer.

14. The high voltage battery module of claim 11 wherein the intumescent layer further includes a filler.

15. The high voltage battery module of claim 11 wherein the cooling fin assemblies are encapsulated by the intumescent layer.

16. The high voltage battery module of claim 11 wherein the resin that is cross-linked by melamine is an alkyd resin.

17. A high voltage battery module comprising:
a plurality of battery cells;
a plurality of cooling fins dispersed between the plurality of battery cells;
a frame for holding the plurality of battery cells and the plurality of cooling fins; and
an intumescent layer proximate to at least one battery module component, the intumescent layer consisting of:
   sodium silicate having a formula $Na_2SiO_3$;
   pentaerythritol;
   a resin that is cross-linked by melamine;
   boron nitride particles; and
   triammonium phosphate;
wherein the sodium silicate is present in an amount from about 25 weight percent to 50 weight percent of the total weight of the intumescent layer, the pentaerythritol is present in an amount from about 2 weight percent to 20 weight percent of the total weight of the intumescent layer, the resin cross-linked by melamine is present in an amount from about 20 weight percent to 60 weight percent of the total weight of the intumescent layer, the boron nitride particles are present in an amount from about 2 weight percent to 30 weight percent of the total weight of the intumescent layer, and triammonium phosphate is present in an amount from about 0.1 weight percent to 3 percent of the total weight of the intumescent layer.

18. The high voltage battery module of claim 17 wherein the resin that is cross-linked by melamine includes a polyester resin or an epoxy resin.

* * * * *